United States Patent
Deng et al.

(10) Patent No.: US 11,579,670 B2
(45) Date of Patent: Feb. 14, 2023

(54) ARRAY SUBSTRATE AND DISPLAY PANEL

(71) Applicants: Chengdu BOE Optoelectronics Technology Co., Ltd., Chengdu (CN); BOE TECHNOLOGY GROUP CO., LTD., Beijing (CN)

(72) Inventors: Yin Deng, Beijing (CN); Hao Luo, Beijing (CN); Ting Li, Beijing (CN); Bo Wu, Beijing (CN); Dongmei Wei, Beijing (CN); Chaoguan Gong, Beijing (CN)

(73) Assignees: CHENGDU BOE OPTOELECTRONICS TECHNOLOGY CO., LTD., Chengdu (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/895,423

(22) Filed: Jun. 8, 2020

(65) Prior Publication Data
US 2021/0191481 A1   Jun. 24, 2021

(30) Foreign Application Priority Data
Dec. 20, 2019  (CN) .......................... 201911329771.4

(51) Int. Cl.
*G06F 1/18* (2006.01)
*G06F 1/16* (2006.01)

(52) U.S. Cl.
CPC ............ *G06F 1/189* (2013.01); *G06F 1/1652* (2013.01)

(58) Field of Classification Search
CPC ....................................................... H05K 1/181
See application file for complete search history.

(56) References Cited

U.S. PATENT DOCUMENTS

| 2013/0188369 | A1* | 7/2013 | Chien | ................... | H05K 1/181 |
| | | | | | 362/363 |
| 2016/0093685 | A1 | 3/2016 | Kwon et al. | | |
| 2017/0162637 | A1 | 6/2017 | Choi et al. | | |

FOREIGN PATENT DOCUMENTS

| CN | 107728348 A | 2/2018 |
| CN | 109283717 A | 1/2019 |
| CN | 109410764 A | 3/2019 |

OTHER PUBLICATIONS

Office Action dated May 13, 2022, in Chinese Patent Application No. 201911329771.4, 14 pages.

* cited by examiner

*Primary Examiner* — Jerry Wu
(74) *Attorney, Agent, or Firm* — Xsensus LLP

(57) ABSTRACT

The present disclosure relates to the field of display technology, and provides an array substrate and a display panel. The array substrate is provided with a via hole and further includes an annular wiring area. The annular wiring area is located around the via hole and is provided with an incision extending toward an outer edge of the annular wiring area along an inner edge of the annular wiring area, and at least a portion of the annular wiring area is bent toward a side away from a display side along the inner edge.

20 Claims, 5 Drawing Sheets

ARRAY SUBSTRATE AND DISPLAY PANEL

CROSS-REFERENCE TO RELATED APPLICATION

This application is based upon, claims the benefit of, and claims priority to Chinese Patent Application No. 201911329771.4, filed on Dec. 20, 2019, the contents of which are incorporated by reference in their entirety herein.

TECHNICAL FIELD

The present disclosure relates to the field of display technology and, in particular to an array substrate and a display panel.

BACKGROUND

With the development of display technologies, the appearance of display products has become more and more diversified. For example, the display panel has a structure having a center via hole. In the related art, gate lines and data lines of the display panel having the center via hole are distributed along the edge of the center via hole, such that there is a wider border on the edge of the display panel having the center via hole.

It should be noted that the information disclosed in the background above is merely for enhancement of understanding of the background of the present disclosure and therefore, may include information that does not constitute the prior art known to those of ordinary skill in the art.

SUMMARY

An object of the present disclosure is to provide an array substrate and a display panel.

Other characteristics and advantages of the present disclosure will become apparent from the following detailed description, or partly learned through the practice of the present disclosure.

According to an aspect of the present disclosure, an array substrate is provided with a via hole, wherein the array substrate further includes an annular wiring area located around the via hole, the annular wiring area is provided with an incision extending toward an outer edge of the annular wiring area along an inner edge of the annular wiring area, and at least a portion of the annular wiring area is bent from the inner edge toward a side away from a display side.

According to another aspect of the present disclosure, a display panel including the above-mentioned array substrate is provided.

It should be understood that the above general description and the following detailed description are only exemplary and explanatory, and do not limit the present disclosure.

BRIEF DESCRIPTION OF THE DRAWINGS

The drawings herein are incorporated into and constitute a part of this specification, show embodiments consistent with the present disclosure, and are used to explain the principles of the present disclosure together with the specification. Understandably, the drawings in the following description are only some embodiments of the present disclosure. For those of ordinary skill in the art, other drawings can be obtained based on these drawings without any creative effort.

DETAILED DESCRIPTION

Figure 1:
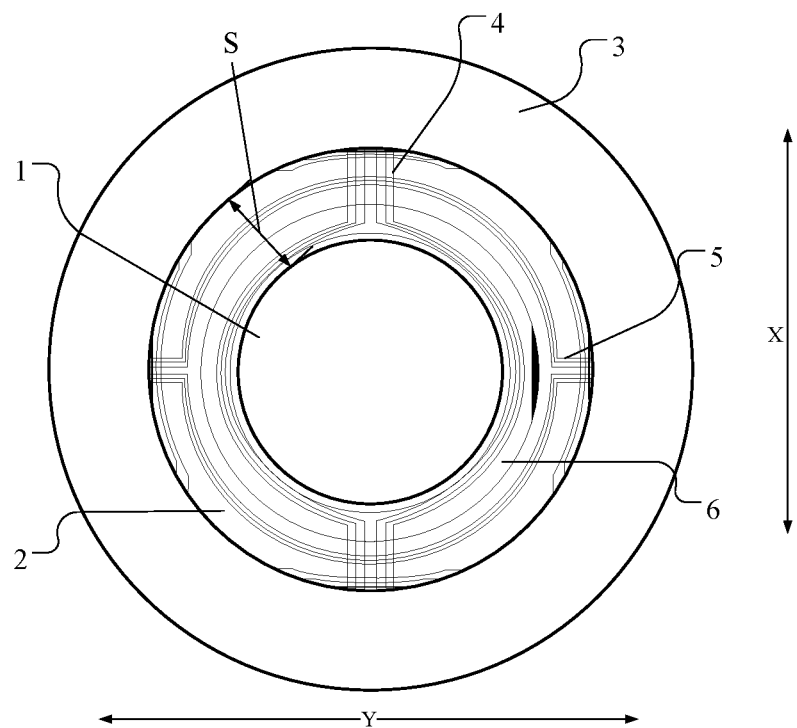
FIG. 1 is a schematic structural diagram of an array substrate in the related art.

Example embodiments will now be described more fully with reference to the drawings. However, the example embodiments can be implemented in various forms, and should not be construed as being limited to the examples set forth herein. Rather, these embodiments are provided to make the present disclosure more comprehensive and complete, and fully convey the ideas of the example embodiments to those skilled in the art. The same reference numerals in the drawings indicate the same or similar structures, and thus their detailed description will be omitted.

Although relative terms are used in this specification, such as "upper" and "lower," to describe the relative relationship between one component and another component shown in the drawings, these terms are used in this specification only for convenience, for example, in the direction shown in the examples of the drawings. It can be understood that if the device shown is turned upside down, the component described as "upper" will become the "lower" component. Other relative terms, such as "high", "low", "top", "bottom", "left", "right", etc., have similar meanings. When a structure is said to be "on" another structure, it may indicate that the structure is integrally formed on the other structure, or that the structure is "directly" provided on the other structure, or that the structure is provided on the other structure "indirectly" through another structure.

The terms "a," "an," "the," and "said" are used to indicate the presence of one or more elements, components, etc. The terms "include/including" and "have/having" are used to represent an open-ended sense of inclusion and mean that there may be additional elements, components, etc., in addition to the listed elements, components, etc.

As shown in FIG. 1, there is shown a schematic structural diagram of an array substrate in the related art. The array substrate includes a via hole 1, an annular wiring area 2 located around the via hole 1, and a display area 3 located around the annular wiring area 2. In the annular wiring area, first signal lines 4 which extend into the annular wiring area along a first direction X and second signal lines 5 which extend into the annular wiring area along a second direction Y are provided. The first signal lines 4 may be data lines, and the second signal lines 5 may be gate lines. The array substrate further includes an annular sealant area 6 close to an inner edge of the annular wiring area. The annular sealant area is configured to provide sealant so that the array substrate and a color filter substrate are cell aligned. As shown in FIG. 1, the width of the annular wiring area is S. Since a large number of gate lines and data lines need to be provided in the annular wiring area, the width of the annular wiring area is large, which results in a wide border around the via hole 1 of the display panel.

Figure 2:
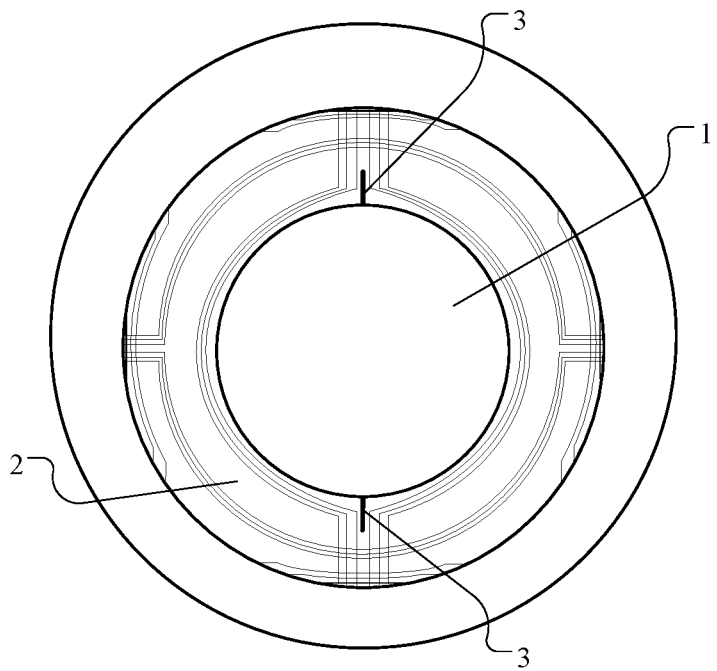
FIG. 2 is a schematic structural diagram of an array substrate in an example embodiment of the present disclosure.
Figure 3:
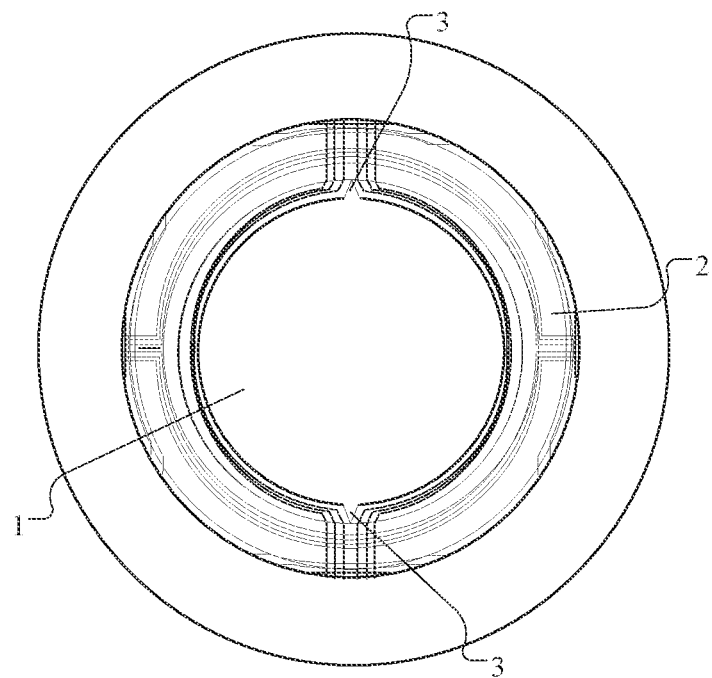
FIG. 3 is a schematic structural diagram of an array substrate in another example embodiment of the present disclosure.

In view of this, the example embodiments of the present disclosure provide an array substrate, as shown in FIGS. 2 and 3. FIG. 2 is a schematic structural diagram of an array substrate in an example embodiment of the present disclosure, and FIG. 3 is a schematic structural diagram of an array substrate in another example embodiment of the present disclosure. The array substrate is provided with a via hole 1, and the array substrate further includes an annular wiring area 2 which is located around the via hole 1. The annular wiring area 2 is provided with an incision extending toward an outer edge of the annular wiring area along an inner edge of the annular wiring area, and at least a portion of the annular wiring area 2 is bent from the inner edge toward a side away from a display side. FIG. 2 is a schematic structural diagram showing the array substrate before the annular wiring area 2 is bent, and FIG. 3 is a schematic structural diagram showing the array substrate after the annular wiring area 2 is bent.

The array substrate provided in the present example embodiment is provided with the incision 3 extending toward the outer edge of the annular wiring area 2 along the inner edge of the annular wiring area 2 so that a portion of the annular wiring area 2 can be bent toward the side away from the display side from the inner edge thereof, which reduces the width of the annular wiring area, that is, reduces the width of the border around the via hole.

In this example embodiment, the bent portion of the annular wiring area may be bent to a side of the array substrate. For example, the bent portion of the annular wiring area may be perpendicular to a substrate surface of the array substrate. The bent portion of the annular wiring area may also be bent to a back side of the array substrate. For example, the bent portion of the annular wiring area may be parallel to the substrate surface of the array substrate. It should be understood that there are many ways for the bent portion of the annular wiring area to be bent from the inner edge to the side away from the display side. For example, an angle formed between the bent portion of the annular wiring area and the back side of the array substrate is an acute angle.

In the present example embodiment, the substrate at the annular wiring area 2 may be a flexible substrate which facilitates bending of the portion of the annular wiring area. The incision 3 cannot intersect the signal lines in the annular wiring area to avoid cutting off the signal lines. There may be one or more incisions 3. The more incisions 3 that are provided, the easier it is to bend the annular wiring area, and the less likely the signal lines in the bent portion of the annular wiring area are to be broken.

Figure 4:
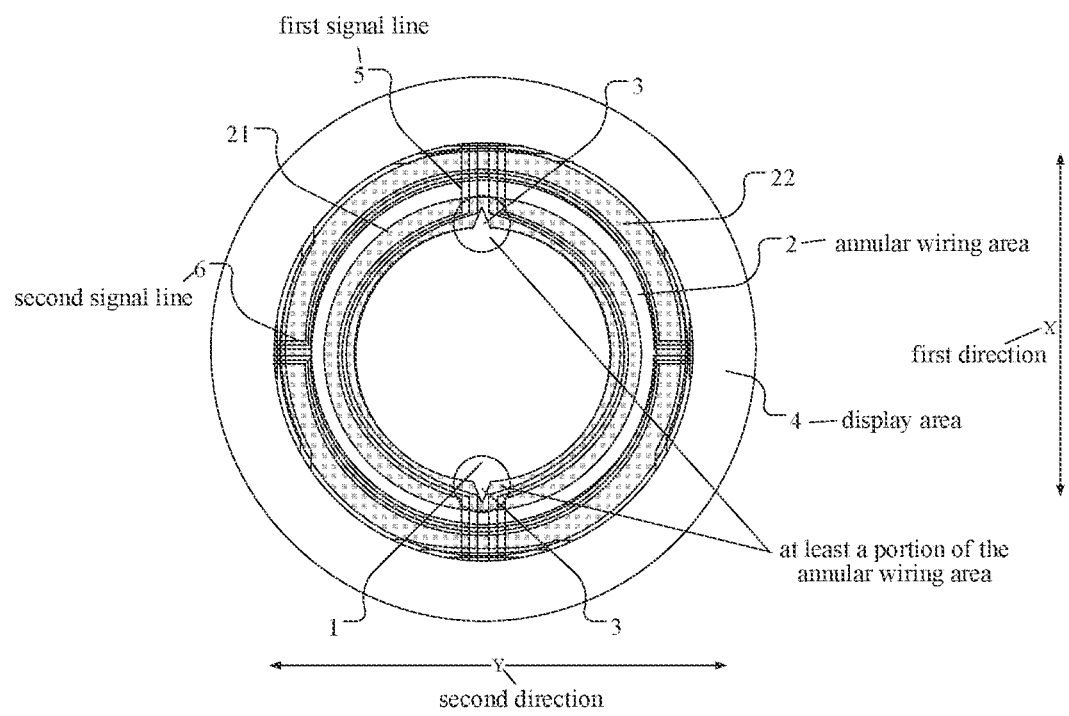
FIG. 4 is a schematic structural diagram of an array substrate in another example embodiment of the present disclosure.

In an example embodiment, as shown in FIG. 4, a schematic structural diagram of an array substrate in another example embodiment of the present disclosure is shown. The array substrate may further include a display area 4 located around the annular wiring area 2, in which first signal lines 5 extending in the first direction X and second signal lines 6 extending in the second direction Y are provided. The annular wiring area includes a first annular wiring area 21 and a second annular wiring area 22 surrounding the first annular wiring area 21. Part of the first signal lines 5 extend into the first annular wiring area 21 in the first direction X and extend along the first annular wiring area 21, and part of the second signal lines 6 extend into the second annular wiring area 22 in the second direction Y and extend along the second annular wiring area 22.

In this example embodiment, the first signal lines can be data lines, and the second signal lines can be gate lines. The data lines may include a signal line for providing a data signal to a pixel driving circuit, a power signal line for providing a power signal to a power signal terminal of the pixel driving circuit, and a sensing signal line connected with a source/drain of a sensing transistor in the pixel driving circuit. The gate lines may include a signal line for providing a gate driving signal to the pixel driving circuit, and a signal line for providing a control signal to the gate of the sensing transistor in the pixel driving circuit. It should be understood that in other example embodiments, the first signal lines may be gate lines, and the second signal lines may be data lines.

In this example embodiment, as shown in FIG. 4, the first annular wiring area 21 and the second annular wiring area 22 may be spaced at an interval. It should be understood that, in other example embodiments, the first annular wiring area 21 and the second annular wiring area 22 may also be disposed adjacent to each other.

Figure 5:
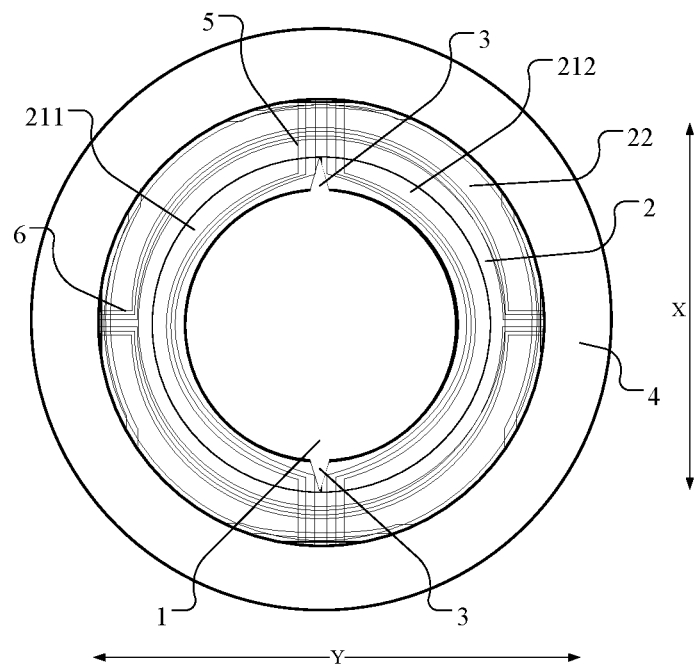
FIG. 5 is a schematic structural diagram of an array substrate in yet another example embodiment of the present disclosure.

In an example embodiment, as shown in FIG. 5, a schematic structural diagram of an array substrate in another example embodiment of the present disclosure is shown. The first annular wiring area 21 can include a first semi-annular wiring area 211 and a second semi-annular wiring area 212 divided evenly in the first direction X. The first signal lines 5 extending into the first semi-annular wiring area 211 in the first direction X extend along the first semi-annular wiring area 211, and the first signal lines 5 extending into the second semi-annular wiring area 212 in the first direction X extend along the second semi-annular wiring area 212, and the first signal lines 5 do not intersect each other. As shown in FIG. 5, the incision 3 can be located in the first annular wiring area 21, and between an innermost first signal line 5 in the first semi-annular wiring area 211 and an innermost first signal line 5 in the second semi-annular wiring area 212. The present example embodiment provides a distribution manner of the first signal lines and the second signal lines and a setting manner of the incision, which can prevent the incision 3 from intersecting the first and the second signal lines.

In this example embodiment, a density of the first signal lines can be lower than that of the second signal lines, thereby facilitating the setting of the incision 3. As shown in FIG. 5, two incisions 3 can be provided, which are respectively located between the innermost first signal line 5 in the first semi-annular wiring area 211 and the innermost first signal line 5 in the second semi-annular wiring area 212. The incisions 3 may extend in the first direction, and extend to the outer edge of the first annular wiring area. With such arrangement, a portion of the first annular wiring area in which the first signal lines are distributed can be bent toward the side away from the display side, thereby effectively reducing the width of the border around the via hole.

It should be understood that, in other example embodiments, there are various distribution manners for the first and the second signal lines and, as such, there are various arrangements for the incisions, which fall within the protection scope of the present disclosure.

In the example embodiments, the array substrate described above is a single-gate array substrate, that is, the array substrate including only the gate driving circuit on a side of the display area, and the gate lines (the second signal lines) on both sides of the via hole 1 need to be connected through the second annular wiring area. In a case where the array substrate is a double-gate array substrate, that is, the array substrate provided with gate drive circuits on opposite sides of the display area, the gate lines on each side of the via hole 1 are driven by the gate drive circuit on each side, respectively, and thus the gate lines located on both sides of the via hole 1 do not need to be connected through the annular wiring area. Only data lines (the first signal lines) are distributed in the annular wiring area 2.

Figure 6:
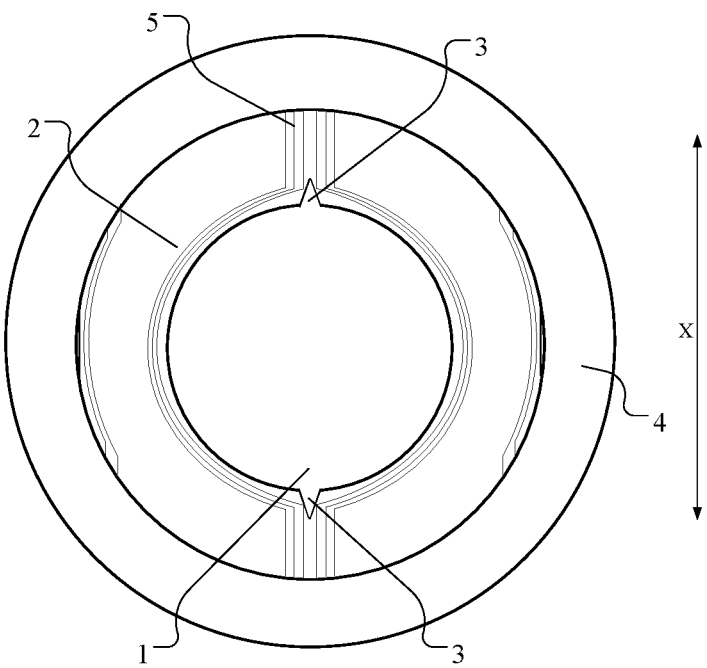
FIG. 6 is a schematic structural diagram of an array substrate in yet another example embodiment of the present disclosure.

In an example embodiment, as shown in FIG. 6, there is shown a schematic structural diagram of an array substrate in another example embodiment of the present disclosure. The array substrate is the double-gate array substrate. Compared with the array substrate provided in FIG. 3, this array substrate may further include a display area 4 located around the annular wiring area, in which the first signal lines 5 extending in the first direction X are provided, the first signal lines 5 extend into the annular wiring area 2 in the first direction X and extend along the annular wiring area 2. The incisions 3 do not intersect the first signal lines 5.

Figure 7:
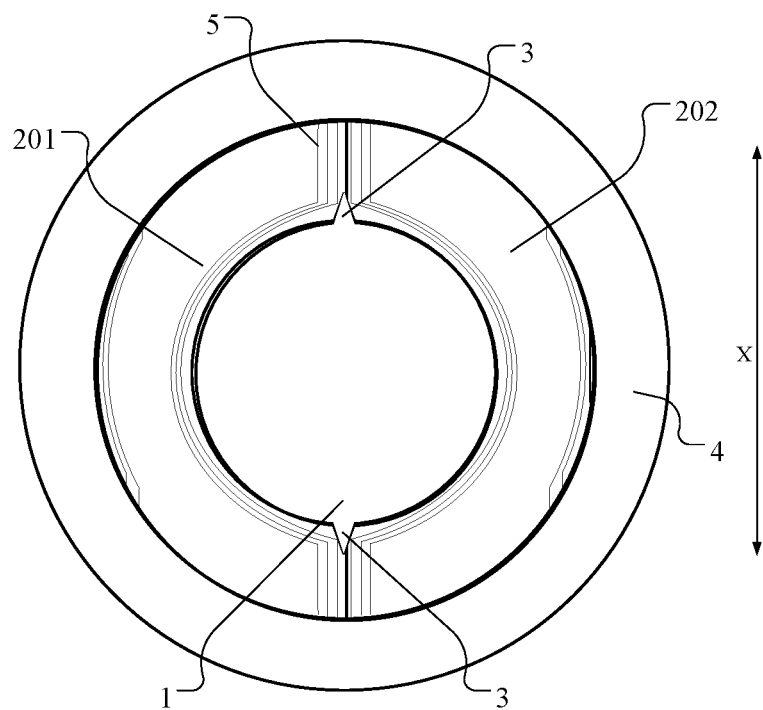
FIG. 7 is a schematic structural diagram of an array substrate in yet another example embodiment of the present disclosure.

In an example embodiment, as shown in FIG. 7, there is shown a schematic structural diagram of an array substrate in another example embodiment of the present disclosure. The annular wiring area may include a first semi-annular wiring area 201 and a second semi-annular wiring area 202 that are divided evenly in the first direction X. The first signal lines 5 extending into the first semi-annular wiring area 201 in the first direction X extend along the first semi-annular wiring area 201, and the first signal lines 5 extending into the second semi-annular wiring area 202 in the first direction X extend along the second semi-annular wiring area 202, and the first signal lines 5 do not intersect each other. The incisions 3 can be located in the annular wiring area 2 and between the innermost first signal line 5 in the first semi-annular wiring area 201 and the innermost first signal line 5 in the second semi-annular wiring area 202. The incisions 3 can extend in the first direction X to avoid intersecting the first signal lines. The present example embodiment provides a distribution manner of the first signal lines and a setting manner of the incisions, which can avoid the intersection of the incisions 3 and the first signal lines.

It should be understood that, in other example embodiments, there are various distribution manners for the first signal lines, and accordingly, there are various arrangements for the incisions, which fall within the protection scope of the present disclosure.

Figure 8:
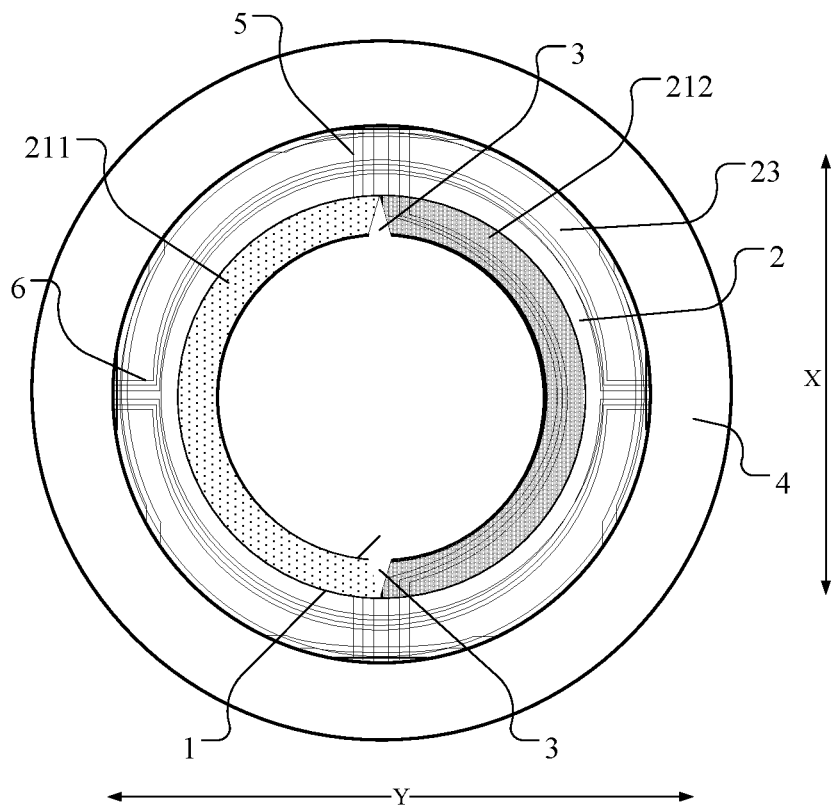
FIG. 8 is a schematic structural diagram of an array substrate in yet another example embodiment of the present disclosure.

In an example embodiment, as shown in FIG. 8, there is shown a schematic structural diagram of an array substrate in another example embodiment of the present disclosure. The annular wiring area 2 can further include an annular sealant area 23 for providing sealant, and the annular sealant area 23 is close to the outer edge of the annular wiring area 2, that is, a distance from the annular sealant area 23 to the outer edge of the annular wiring area 2 is less than the distance from the annular sealant area 23 to the inner edge of the annular wiring area 2. For example, the annular sealant area 23 can be disposed along the outer edge of the annular wiring area 2. The sealant is provided between the array substrate and the color filter substrate so as to facilitate the cell alignment of the array substrate and the color filter substrate. The annular sealant area 23 may partially overlap with the second annular wiring area 22 or the first annular wiring area 21.

Figure 9:
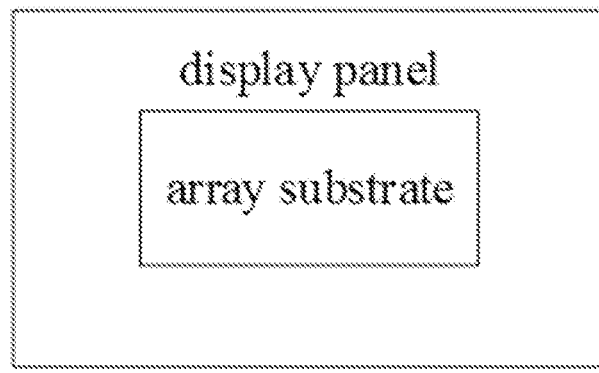
FIG. 9 is a schematic structural diagram of a display panel in an example embodiment of the present disclosure.

The present example embodiment also provides a display panel including the above-mentioned array substrate, as shown in FIG. 9. The display panel can be applied to display devices such as TVs, mobile phones, notebook computers, and the like.

Figure 10:
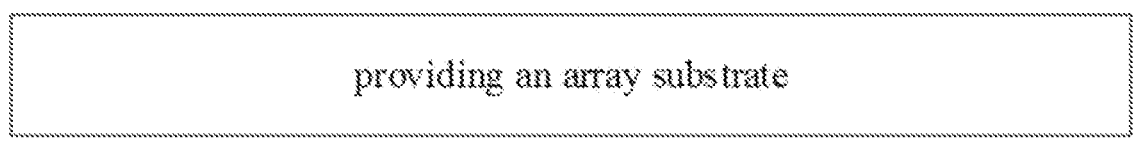
FIG. 10 is a flowchart of a method of providing an array substrate in an example embodiment of the present disclosure.

The present example embodiment further provides a method of providing an array substrate, as shown in FIG. 10.

The present disclosure provides an array substrate and a display panel. The array substrate is provided with a via hole, and further includes an annular wiring area. The annular wiring area is located around the via hole; the annular wiring area is provided with an incision extending toward an outer edge of the annular wiring area along an inner edge of the annular wiring area, and at least a portion of the annular wiring area is bent along the inner edge towards a side away from a display side. In the array substrate provided in the present disclosure, the portion of the annular wiring area is bent toward the side away from the display side, thereby reducing a width of the annular wiring area, that is, the width of the border around the via hole.

After considering the description and practicing the disclosure disclosed herein, those skilled in the art will easily think of other embodiments of the present disclosure. This application is intended to cover any variations, uses, or adaptive changes of the present disclosure that follow the general principles of the present disclosure and include common general knowledge or common technical means in the technical field which are not disclosed in the present disclosure. The description and embodiments shall be considered as examples only, and the true scope and spirit of this disclosure are defined by the claims.

It should be understood that the present disclosure is not limited to the precise structures that have been described above and shown in the drawings, and various modifications and changes can be made without departing from the scope thereof. The scope of the present disclosure is defined only by the appended claims.

Therefore, the following is claimed:

1. An array substrate, comprising: a via hole; and an annular wiring area located around the via hole, wherein the annular wiring area is provided with an incision extending toward an outer edge of the annular wiring area from an inner edge of the annular wiring area, and at least a portion of the annular wiring area is bent toward a side away from a display side along the incision, the array substrate further comprises a display area continuously located surrounding the annular wiring area in which first signal lines extending in a first direction and second signal lines extending in a second direction perpendicular to the first direction and surrounding the first annular wiring area are provided, wherein a density of the first signal lines is lower than that of the second signal lines; and the annular wiring area and the display area form a display panel and display an image.

2. The array substrate according to claim 1, wherein:
the annular wiring area comprises a first annular wiring area and a second annular wiring area surrounding the first annular wiring area;
part of the first signal lines extend into the first annular wiring area in the first direction, and extend along the first annular wiring area; and part of the second signal lines extend into the second annular wiring area in the second direction, and extend along the second annular wiring area.

3. The array substrate according to claim 2, wherein the incision is located in the first annular wiring area and does not intersect the first signal lines.

4. The array substrate according to claim 3, wherein:
the first annular wiring area comprises a first semi-annular wiring area and a second semi-annular wiring area which are divided in the first direction;
the first signal lines extending into the first semi-annular wiring area in the first direction extend along the first semi-annular wiring area, and the first signal lines extending into the second semi-annular wiring in the first direction extend along the second semi-annular wiring area, and the first signal lines do not intersect each other; and
the incision is located between an innermost first signal line in the first semi-annular wiring area and an innermost first signal line in the second semi-annular wiring area.

5. The array substrate according to claim 4, wherein the incision comprises two incisions.

6. The array substrate according to claim 5, wherein the incisions extend in the first direction and extend to an outer edge of the first annular wiring area.

7. The array substrate according to claim 2, wherein:
the first signal lines are data lines, and the second signal lines are gate lines; or
the second signal lines are data lines, and the first signal lines are gate lines.

8. The array substrate according to claim 1, wherein:
the array substrate further comprises a display area located around the annular wiring area, and the display area is provided with first signal lines extending in a first direction; and
part of the first signal lines extend into the annular wiring area in the first direction, and extend along the annular wiring area.

9. The array substrate according to claim 8, wherein the incision does not intersect the first signal lines.

10. The array substrate according to claim 9, wherein:
the annular wiring area comprises a first semi-annular wiring area and a second semi-annular wiring area which are divided in the first direction;
the first signal lines extending into the first semi-annular wiring area in the first direction extend along the first semi-annular wiring area, and the first signal lines extending into the second semi-annular wiring in the first direction extend along the second semi-annular wiring area, and the first signal lines do not intersect each other; and
the incision is located between an innermost first signal line in the first semi-annular wiring area and an innermost first signal line in the second semi-annular wiring area.

11. The array substrate according to claim 10, wherein the incision comprises two incisions.

12. The array substrate according to claim 11, wherein the incision extends in the first direction.

13. The array substrate according to claim 1, wherein the incision comprises a plurality of incisions.

14. The array substrate according to claim 1, wherein the substrate in the annular wiring area is a flexible substrate.

15. The array substrate according to claim 1, wherein the annular wiring area further comprises an annular sealant area for providing sealant, and the annular sealant area is close to the outer edge of the annular wiring area.

16. The array substrate according to claim 1, wherein the bent portion of the annular wiring area is parallel to a substrate surface of the array substrate.

17. The array substrate according to claim 1, wherein an angle formed between the bent portion of the annular wiring area and a back side of the array substrate is an acute angle.

18. The array substrate according to claim 1, wherein the bent portion of the annular wiring area is perpendicular to a substrate surface of the array substrate.

19. A display panel, comprising: an array substrate, comprising: a via hole; and an annular wiring area located around the via hole, wherein the annular wiring area is provided with an incision extending toward an outer edge of the annular wiring area from an inner edge of the annular wiring area, and at least a portion of the annular wiring area is bent toward a side away from a display side along the incision, the array substrate further comprises a display area continuously located surrounding the annular wiring area in which first signal lines extending in a first direction and second signal lines extending in a second direction perpendicular to the first direction and surrounding the first annular wiring area are provided, wherein a density of the first signal lines is lower than that of the second signal lines; and the annular wiring area and the display area form a display panel and display an image.

20. A method, comprising: providing an array substrate, the array substrate comprising: a via hole; and an annular wiring area located around the via hole, wherein the annular wiring area is provided with an incision extending toward an outer edge of the annular wiring area from an inner edge of the annular wiring area, and at least a portion of the annular wiring area is bent toward a side away from a display side along the incision, the array substrate further comprises a display area continuously located surrounding the annular wiring area in which first signal lines extending in a first direction and second signal lines extending in a second direction perpendicular to the first direction and surrounding the first annular wiring area are provided, wherein a density of the first signal lines is lower than that of the second signal lines; and the annular wiring area and the display area form a display panel and display an image.

* * * * *